Feb. 19, 1963 L. NAMENYI-KATZ 3,078,057
TAPE RECORDER CONSTRUCTION
Filed June 23, 1961
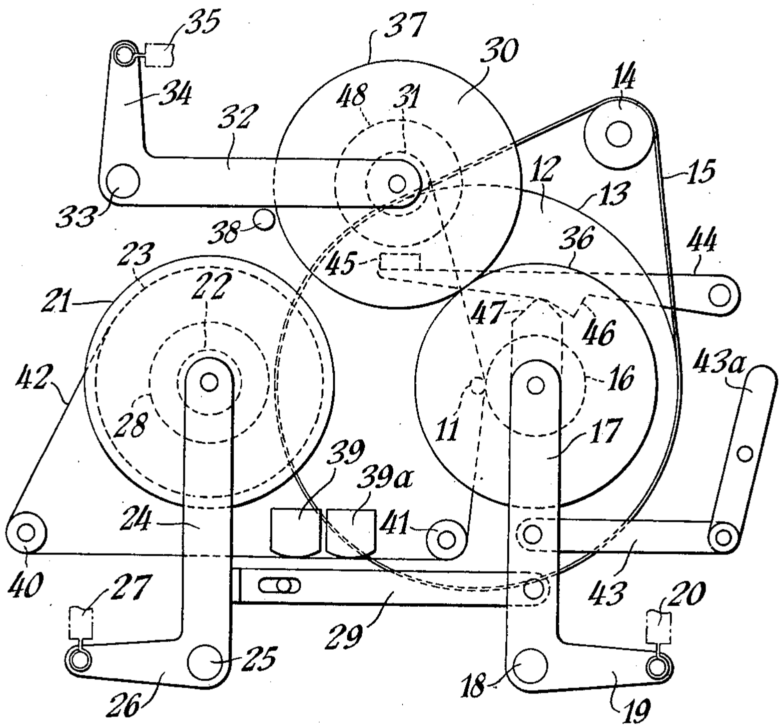
INVENTOR
LASZLO NAMENYI-KATZ
Imirie + Smiley
Attys.

United States Patent Office 3,078,057
Patented Feb. 19, 1963

3,078,057

TAPE RECORDER CONSTRUCTION

Laszlo Nameuyi-Katz, Roehampton, London, England, assignor to Vectron Electro-Physics Limited Filed June 23, 1961, Ser. No. 119,126
Claims priority, application Great Britain June 24, 1960
6 Claims. (Cl. 242—55.12)

This invention relates to magnetic tape recorders and its principal object is to provide a simple and compact tape drive mechanism which possesses all the basic movements necessary in a tape recorder and is particularly adapted for use in very small portable recorders.

The invention consists of a tape drive mechanism for a magnetic tape recorder including a motor-driven capstan having a co-axial cylindrical friction surface associated therewith, a pinch roller mounted for lateral movement into and out of engagement with the capstan, said pinch roller having a co-axial cylindrical friction surface associated therewith, a feed spool having a co-axial cylindrical friction surface associated therewith said feed spool being mounted for lateral movement towards and away from the capstan to allow the respective friction surfaces to be engaged and disengaged, a spring to urge the feed spool towards the capstan, a take-up spool having a co-axial cylindrical friction surface associated therewith, said take-up spool being mounted for lateral movement towards and away from the pinch roller to allow the respective friction surfaces to be engaged and disengaged, a spring to urge the take-up spool towards the pinch roller, a stop to limit the movement of the take-up spool towards the pinch roller arranged so that the respective friction surfaces are only in engagement with the pinch roller is in engagement with the capstan, and mechanical coupling means between the pinch roller and the feed spool arranged so that when the pinch roller is in engagement with the capstan the friction surface associated with the feed spool is out of engagement with the friction surface associated with the capstan.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, in which the single FIGURE is a diagrammatic plan view of a tape drive mechanism constructed in accordance with the invention.

The drawing figure is a plan view of a tape deck embodying the present invention.

Referring to the drawing, the mechanism comprises a capstan 11 mounted co-axially in a member 12 having a cylindrical friction surface 13. Conveniently the member 12 is a metal flywheel which, when the recorder is running, assists in preventing undesired fluctuations of capstan speed.

The flywheel 12 is driven by a motor (not shown) having a driving pulley 14, through the medium of a belt 15. If desired the belt may run in a groove in the periphery of the flywheel 12.

Co-operating with the capstan 11 is a pinch roller 16, shown dotted, which is rotatably carried between a bifurcated end portion of an arm 17 pivoted at a point 18. The arm 17 has a sideways extension 19, so that it takes the form of a bell-crank, and a tension spring 20 has one end coupled to the end of the extension 19, the other end of the spring being anchored to the fixed structure. The spring 20 urges the arm 17 in such a direction as to move the pinch roller 16 laterally into engagement with the capstan 11.

A feed spool 21 adapted to accommodate magnetic tape has a hub 22, shown dotted, to which the inner end of the tape is attached and, when the tape is all wound on to it, is filled to a diameter 23. The feed spool 21 is adapted to be rotatably mounted between a bifurcated end portion on an arm 24 pivoted at 25 having a sideways extension 26 which is acted upon by a tension spring 27 in the same way as the arm 17. The spring 27 tends to move the arm 24 in such a direction as to cause lateral movement of the feed spool 21 towards the capstan 11. Associated with the feed spool 21 is a cylindrical friction surface 28 which is adapted to engage the periphery 13 of the flywheel 12 when the arm 24 is moved towards the capstan under the influence of the spring 27. When the surfaces are engaged the feed spool 21 is driven by the flywheel 12.

A push rod 29 linked to the arm 17 presses against the arm 24 so that when the pinch roller 16 is in engagement with the capstan 11 the friction surface 28 is out of engagement with the friction surface 13 of the flywheel 12.

A take-up spool 30 having an inner hub 31 is rotatably mounted between a bifurcated end portion of an arm 32 pivoted at 33 and having a sideways extension 34 acted upon by a spring 35, in a similar manner to the arms 17 and 24 associated respectively with the pinch roller 16 and the feed spool 21. The pinch roller 16 has associated with it a cylindrical friction surface 36 which is adapted to engage a friction surface 37 associated with the take-up spool 30. The surface 37 may, in fact, be one of the flanges of the take-up spool. A stop 38 is so positioned that when the pinch roller 16 is in engagement with the capstan 11 the surface 36 is in engagement with the surface 37 to provide a friction drive, but if the pinch roller 16 is moved to the right on the drawing so that it disengages the capstan 11 the take-up spool 30 is only allowed a limited movement, after which the two friction surfaces 36 and 37 disengage.

The spring 20, which acts on the pinch roller, is made of such strength that it is able to overcome the springs 27 and 35. It thus keeps the pinch roller 16 in engagement with the capstan 11 while keeping the friction surfaces 28 and 13 out of engagement and keeping the arm 32 out of contact with the stop 38. To move the pinch roller away from the capstan a further arm 43, linked to suitable manually operated means such as a pivoted lever *43a* pivoted to the arm 43, is provided by which the pinch roller may be disengaged and retained in the disengaged position. When the pinch roller is fully retracted the surface 28 is allowed to come into frictional contact with the surface 13 and the arm 32 is engaged by the stop 38, so that the surfaces 36 and 37 are disengaged.

Two magnetic heads 39 and *39a* respectively, are provided and conveniently the head 39 is an erasing head, while the head *39a* is a recording/playback head. Two guide rollers, respectively 40 and 41, are located at convenient points on the structure to guide tape from the feed spool 21 past the two magnetic heads 39 and *39a* and to the capstan 11. If desired pressure pads may be associated with the two magnetic heads.

To render the recorder ready for service the feed spool 21, full of tape with the inner end of the tape anchored to the hub 22, is placed in position, the free end 42 of the tape is passed around the guide roller 40, led past the magnetic heads 39 and *39a*, around the guide roller 41, between the capstan 11 and pinch roller 16 and anchored to the hub 31 of the take-up spool 30. Since the spring 20 overcomes the springs 27 and 35, the pinch roller 16 is normally in engagement with the capstan 11 and the surface 36 in engagement with the surface 37. Thus, when the motor is started and drives the pulley 14 in the anti-clockwise direction as seen on the drawing, the flywheel 12 and the capstan 11 also rotate in the anti-clockwise direction and tape is drawn from the supply spool 21, around the guide roller 40, past the magnetic heads 39 and 39*a* and around the guide roller 41. Due to the engagement of the friction surfaces 36 and 37 the take-up spool is rotated in the anti-clockwise direction and winds the tape coming from the capstan on to the take-up spool. Conveniently, the motor may be started by depressing either of two knobs, one labelled "record" and the other labelled "playback" actuation of each knob switching the heads 39 and 39*a* and associated circuitry to a record or playback condition.

The diameters of the surfaces 36 and 37 in relation to the diameter of the capstan 11 are such that the take-up spool 30 always tends to run faster than the speed necessary to wind up the tape, so that there is continual slip between the surfaces 36 and 37. The characteristics of the surfaces 36 and 37 are so chosen in relation to the strength of the spring 35 that the surfaces slip quite easily and no substantial braking load is thrown on to the pinch roller 16, which might cause it to slip in relation to the tape 42 and the capstan 11. When recording or playback has been completed the tape 42 is stopped, because its inner end is anchored to the hub 22, and the capstan slips on the tape. To rewind the tape the arm 43 is moved to the right on the drawing by depressing lever 43*a* to the left, thus moving the pinch roller 16 out of engagement with the capstan 11. The lever 43*a* may be associated with a hand control which has two positions, one, into which it is continually urged by spring 20, in which the pinch roller 16 is engaged with the capstan and the surface 36 is engaged with the surface 37 and in which the surface 28 associated with the feed spool is disengaged from the surface 13 of the flywheel. This said one position corresponds to a record or playback position. In the second position, in which the lever 43*a* only remains while being manually depressed, the push rod 29 allows the arm 24 to move the feed spool to such an extent, under the influence of the spring 27, that the surface 28 engages the surface 13 of the flywheel 12 while surfaces 36 and 37 and pinch roller 16 and capstan 11 are disengaged. The feed spool is then driven at high speed in the clockwise direction by the flywheel 12 until the whole of the tape has been re-wound on to the feed spool 21. It should be understood that the arrangement is such that the surface 28 engages a part of the surface 13 which is not occupied by the belt 15. Conveniently the guide roller 40 is so positioned that when the whole of the tape has been wound back on to the feed spool 21 and the tape tightens, due to the fact that its end is anchored to the hub 31, the angle at which the tape pulls on the spool 21 is such as to tend to move the arm 24 in the anti-clockwise direction so that the engagement between the surface 28 and the surface 13 is reduced. As soon as the drive to the spool 21 is reduced it is caused to rotate, due to the tape tension, slightly in the anti-clockwise direction to allow the surface 28 to re-engage the surface 13. This occurs quite rapidly and causes a vibrating noise which gives a clear aural indication that the whole of the tape has been rewound.

In actuating the lever 43*a* from its said other position to its said one position, it has been found desirable to brake the spool 30 momentarily during the traverse of the lever 43*a*. This prevents any tape still on spool 30 from being unwound off the spool unnecessarily which might lead to jamming of the tape. For this purpose, a brake lever 44 is provided pivoted at its outer end, and having a braking pad 45 secured to its inner end. Intermediate the length of the lever 44 is a cam portion 46 which is adapted to ride over a pointed end 47 on the extended lower member of the bifurcated arm 17 as the lever 43*a* moves from left to right and vice versa. In operation, when the depressed lever 43*a* is released for returning to its one position, the pointed end 47 of arm 17 moves from right to left over cam portion 46 urging the brake pad 45 into contact momentarily with a brake drum 48 mounted co-axially with the spool 30.

It should be understood that whereas the preferred form of the invention above is described in connection with a magnetic tape drive mechanism the invention may also be useful for a magnetic wire recorder and the word "tape" as used herein is to be read as including "wire."

I claim:

1. A tape drive mechanism for a magnetic tape recorder including a motor-driven capstan having a co-axial cylindrical friction surface associated therewith, a pinch roller mounted for lateral movement into and out of engagement with the capstan, said pinch roller having a co-axial cylindrical friction surface associated therewith, a feed spool having a co-axial cylindrical friction surface associated therewith, said feed spool being mounted for lateral movement towards and away from the capstan to allow the respective friction surfaces to be engaged and disengaged, a first spring to urge the feed spool towards the capstan, a take-up spool having a co-axial cylindrical friction surface associated therewith, said take-up spool being mounted for lateral movement towards and away from the pinch roller to allow the respective frictions surfaces to be engaged and disengaged, a second spring to urge the take-up spool towards the pinch roller, a stop to limit the movement of the take-up spool towards the pinch roller arranged so that the respective friction surfaces are only in engagement when the pinch roller is in engagement with the capstan, and mechanical coupling means between the pinch roller and the feed spool arranged so that when the pinch roller is in engagement with the capstan the friction surface associated with the feed spool is out of engagement with the friction surface associated with the capstan.

2. A mechanism as claimed in claim 1 including a third spring for urging the pinch roller towards the capstan, the strength of the said third spring being such that it overcomes the said first and second springs.

3. A mechanism as claimed in claim 2 including a manually operable lever mechanically coupled to the pinch roller, said lever having one position corresponding to a record or playback condition in which the pinch roller engages the capstan, and another position corresponding to a condition for the tape being rewound on to the feed spool in which the pinch roller is disengaged from the capstan.

4. A mechanism as claimed in claim 3, including brake means which momentarily act upon the take-up spool to brake same as said lever is moved between the two said positions.

5. A mechanism as claimed in claim 4 in which said brake means comprises a brake lever pivoted at one end, a brake pad attached to said lever at the other end and a cam portion intermediate the length of said brake lever, and including a cylindrical surface on said take-up spool and an arm of the pinch roller having an end portion which is adapted to pivot such that said brake lever engages said end portion and causes said brake pad to engage said cylindrical surface to momentarily brake said take-up spool as said cam portion rides over said end portion.

6. A mechanism as claimed in claim 1, including a roller for guiding the tape, the roller being so disposed with respect to the feed spool that when the tape has been fully wound back on to the feed spool the pull of the tape on the feed spool is such as to tend to move the said friction surface associated therewith out of engagement with the said friction surface associated with the capstan.

No references cited.